United States Patent
Daggett et al.

[11] Patent Number: 5,842,732
[45] Date of Patent: Dec. 1, 1998

[54] RIDING LAWN MOWER CANOPY

[76] Inventors: Bill E. Daggett, deceased, late of San Marcos, Tex.; by Edna Faye Poe, executrix, 2540 Offerman Hill Rd., San Marcos, Tex. 78666

[21] Appl. No.: 758,090

[22] Filed: Nov. 27, 1996

[51] Int. Cl.$^6$ ........................................................ B60J 7/00
[52] U.S. Cl. .................. 296/102; 296/107.17; 135/88.01
[58] Field of Search ..................................... 296/102, 103, 296/104, 105, 107, 77.1, 190; 135/88.01, 88.03

[56] References Cited

U.S. PATENT DOCUMENTS

| | | | |
|---|---|---|---|
| 1,716,212 | 6/1929 | Cushman | 296/102 |
| 3,561,816 | 2/1971 | Koch | 296/102 |
| 3,610,677 | 10/1971 | Hawley et al. | 296/190 |
| 3,912,297 | 10/1975 | Mitsuishi | 296/107 X |
| 5,688,018 | 11/1997 | Simpson | 296/77.1 X |

*Primary Examiner*—Dennis H. Pedder

[57] ABSTRACT

A mower canopy as an add-on attachment for riding lawn mowers which includes brackets mounting front and rear struts in front of and behind the mower operator. The struts telescopingly attach to front and rear adjusters that set the height of the mower canopy. The top of each of the adjusters attaches to a molded plastic mower canopy with reinforcing ribs and reinforcing skirt. A canopy ring attached to the reinforcing skirt adds additional strength to the mower canopy. Braces prevent pivotal movement of the struts and mower canopy so that the mower canopy is easily installed and quickly removed or lowered as the need arises.

9 Claims, 4 Drawing Sheets

RIDING LAWN MOWER CANOPY

BACKGROUND OF THE INVENTION

The present invention relates to a canopy for a riding lawn mower and more particularly to a canopy that is simple in design, rugged in strength, yet economic and simple to install on a riding lawn mower.

In the past, all types of shading devices have been on large farm tractors. Some of the initial shading devices were as simple as an umbrella that may be raised and lowered. As time progressed and technology progressed, other types of shading devices for tractors have been used. Many of the shading devices were after market add-ons that the farmers themselves put on the tractors to provide some shade from the long hours under the hot sun in the fields.

As tractors got more complex and expensive, enclosed cabs became very common with features such as radios or televisions being included in the enclosed cabs. The enclosed cabs would typically be heated or air conditioned depending on the season.

The transition from large farm tractors to riding lawn mowers has taken place in the last few years. However, many of the features that have been included on a larger, more expensive farm tractors have not been included on riding lawn mowers. For example, Applicant does not know of a single riding lawn mower that has an enclosed cab space. Applicant does not know of a riding lawn mower that has a canopy that is sturdy, yet quickly, removable, to provide shade for the operator of the mower when needed. Such a canopy should also be adjustable to allow for adjustments to accommodate the differences in height and size of the operators of riding lawn mowers. Such a canopy should also be simple, yet sturdy, so it is affordable by almost anyone.

SUMMARY OF THE INVENTION

It is an object of the present invention to provide a canopy for a riding lawn mower.

It is another object of the present invention to provide a canopy for a lawn mower that is adjustable in size to fit many different types of lawn mowers operated by different size individuals.

It is still another object of the present invention to provide an after market canopy for riding lawn mowers that can be easily installed by the end user on the end user's personal riding lawn mower.

It is yet another object of the present invention to provide a canopy for a riding lawn mower that is quickly attachable and removable to allow either (a) access to the engine compartment or (b) storage of the riding lawn mower.

These objects are accomplished by means of a canopy made from molded plastic, which canopy includes a canopy ring to provide strength to the edges of the canopy. Ridges throughout the canopy provide additional structural support. Front and rear struts are designed for attachment to the riding lawn mower by strut brackets. A front adjuster extends from the front strut up to the canopy while a rear adjuster extends from the rear strut up to the canopy. A brace connects between the canopy and the rear adjuster to prevent pivotal movement around the points of attachment.

By simply disconnecting one end of the braces and either the front or rear strut, the canopy can be laid down on to the riding mower for ease of storage. Also, by disconnecting the front strut, from the strut bracket, the canopy can be pivoted backwards to allow quick access to the engine compartment. The entire canopy can be very quickly removed if desired.

BRIEF DESCRIPTION OF THE DRAWINGS

Other objects, feature, and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
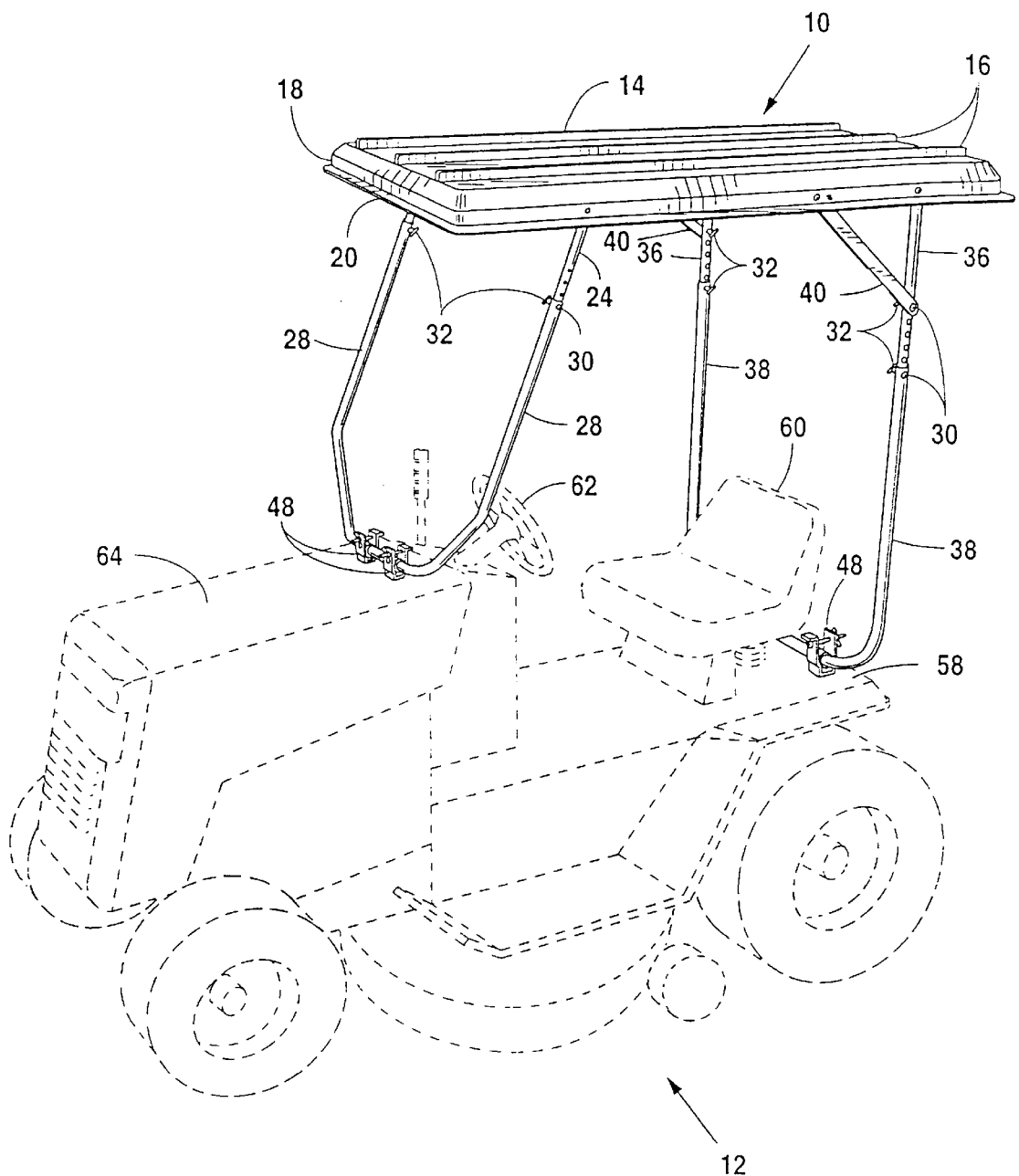
FIG. 1 is a perspective view of a preferred embodiment of the mower canopy of the present invention as installed on a riding lawn mower.
Figure 2:
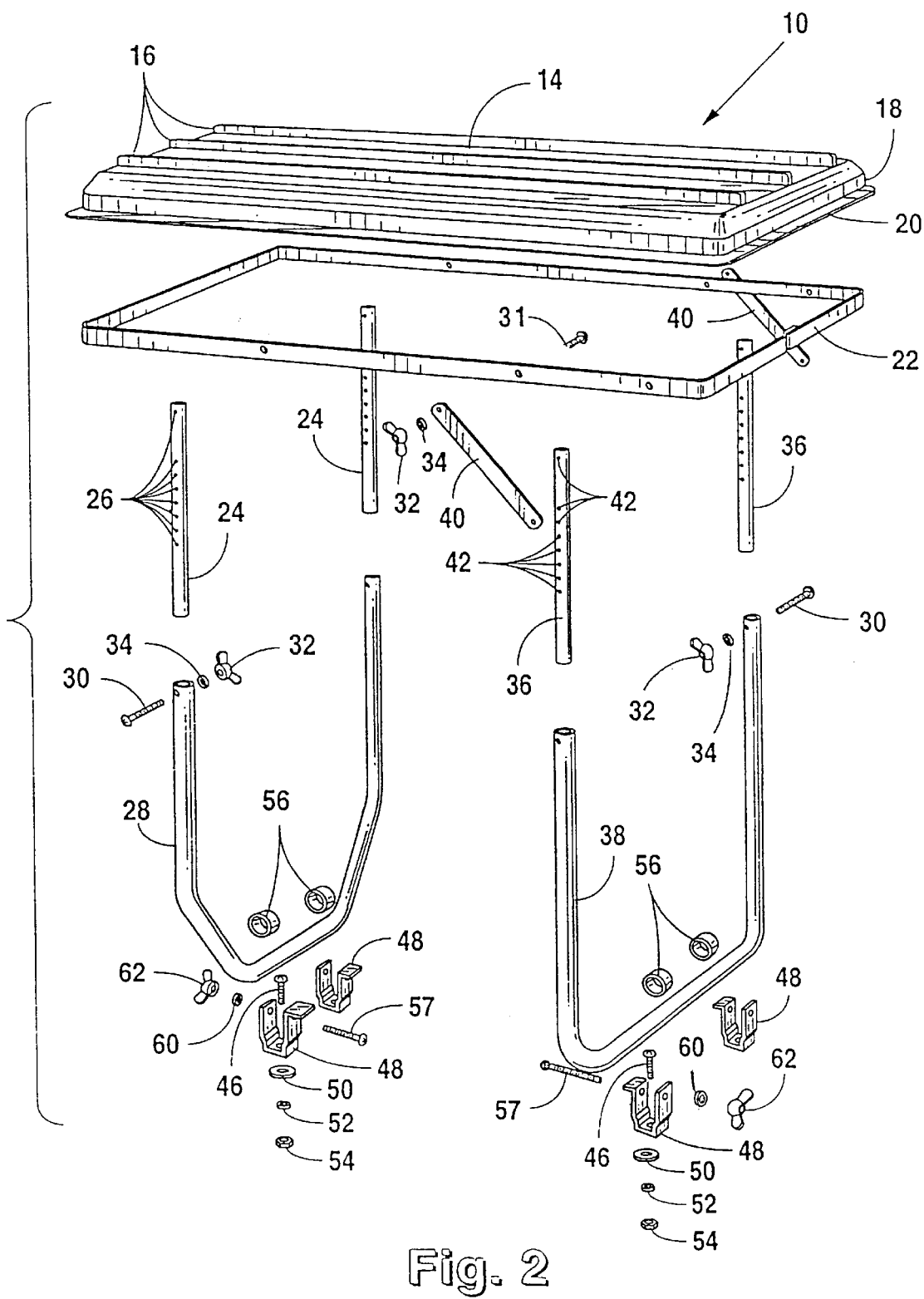
FIG. 2 is an exploded perspective view of the elements of the mower canopy shown in FIG. 1.
Figure 3:
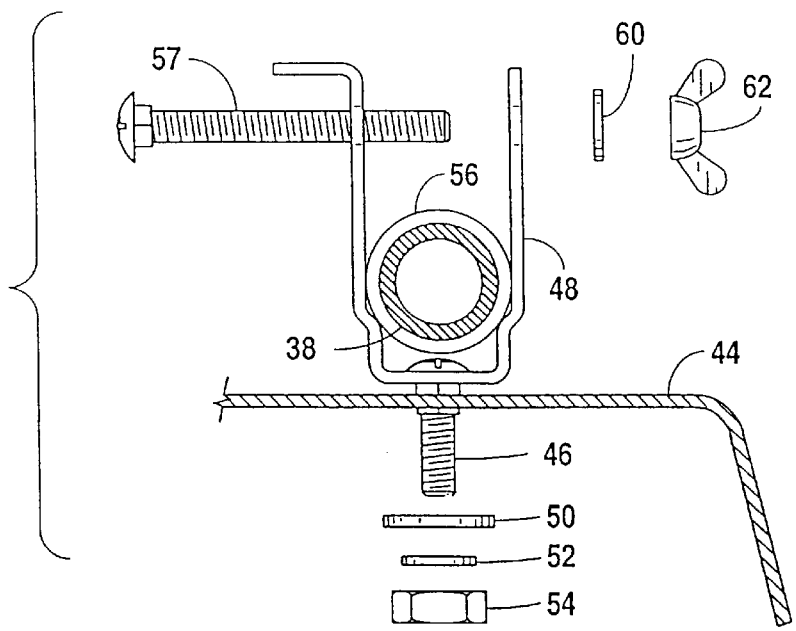
FIG. 3 is an exploded partial, sectional view illustrating the connection of the strut brackets to the riding lawn mower.

The preferred embodiment of the present invention is illustrated by way of example in FIGS. 1–6. Referring to FIG. 1, a mower canopy 10 is shown attached to a riding lawn mower 12. Referring to FIGS. 2 and 3 in combination with FIG. 1, the structure of the mower canopy 10 is explained in further detail. The acual canopy 14 is preferably made from molded plastic and is approximately 0.09 inches thick. The canopy 14 has reinforcing ribs 16 running lengthwise of the canopy 14 and a reinforcing skirt 18 encircling the canopy 14. The lower portion of the reinforcing skirt 18 has an outward flair 20 for additional structural support.

Abutting the inside of the reinforcing skirt 18 of the canopy 14 is a canopy ring 22 (See FIG. 2). The canopy ring 22 is approximately 0.15 inches thick and one inch wide and made of rigid material such as metal. The canopy ring 22 is held to the canopy 14 by any convenient means such as rivets. Preferably, when the end user buys a mower canopy, the canopy ring 22 will already be attached integrally to the canopy 14. Extending down from the front portion of the canopy 14 are front adjusters 24. The front adjusters 24 are preferably made of drawn aluminum and have screw holes 26 through the front adjusters 24 for attachment and adjustment of the height of the front canopy.

The front adjuster 24 is telescopingly received into the front strut 28 and is held in place by pan head Phillips bolts 30 attached to wing nut 32 that is held in place by internal star washer 34. The upper part of the front adjusters 24 is also connected to canopy ring 22 and canopy 14 in a like manner by a pan head Phillips bolt with wing nuts and internal star washers (not shown).

The rear portion of the canopy 14 is held in position by rear strut adjusters 36 which are attached at one end through the canopy 14 and canopy ring 22 by pan head Phillips bolts (not shown). The rear strut adjusters 36 also are preferably made from drawn aluminum and are telescopically received into rear strut 38. The rear strut adjuster 36 and rear strut 38 are likewise secured together by pan head Phillips bolts 30, wing nuts 32, and internal star washers 34. Braces 40, which connect between the canopy 14 and rear strut adjusters 36 in one of the screw holes 42, prevent any pivotal movement of the canopy 14. The braces 40 are preferably made from a flat aluminum bar.

Referring now to FIG. 3 for further detail, an explanation of how the front strut 28 and the rear strut 38 are attached to the riding lawn mower will be provided with a typical example. A hole is drilled in the outer sheet metal 44 of the riding lawn mower 12. Carriage bolt 46 extends through the sheet metal 44 and the strut bracket 48. The carriage bolt 46 extends through fender washer 50, internal star washer 52, and hex head nut 54, which is tightened down to secure the strut bracket 48 into position. Assuming, for purposes of illustration, that the strut bracket 48 illustrated in FIG. 3 is for the rear strut 38, the rear strut 38 is surrounded by a strut grommet 56. The strut bracket 48 and the strut grommet 56 are securely held inside the strut bracket 48 by carriage bolt 57 secured in position by star washer 60 and wing nut 62.

A parts list for the mower canopy for attachment to a riding lawn mower by the individual user is as follows:

| Number of Parts | Parts Description |
| --- | --- |
| 1 | Canopy (14) and internal mounted canopy ring (22) |
| 2 | Front adjuster (24) |
| 1 | Front strut (28) |
| 2 | Rear adjuster (36) |
| 1 | Rear strut (38) |
| 2 | Brace (40) |
| 4 | ¼ inch-20 × ½ inch carriage bolt (46) |
| 4 | ¼ inch-20 × 2 ½ inch carriage bolt (57) |
| 2 | ¼ inch-20 × ¾ inch pan head Phillips bolt (31) |
| 10 | ¼ inch-20 times × 1 ½ inch pan head Phillips bolts (30) |
| 4 | ¼ inch-20 hex head nut (54) |
| 16 | ¼ inch-20 wing nuts (32 & 62) |
| 4 | ¼ inch fender washer (50) |
| 20 | ¼ inch internal star washer (34, 52, & 60) |
| 4 | Grommets (56) |
| 4 | Strut bracket (48) |

Figure 4:
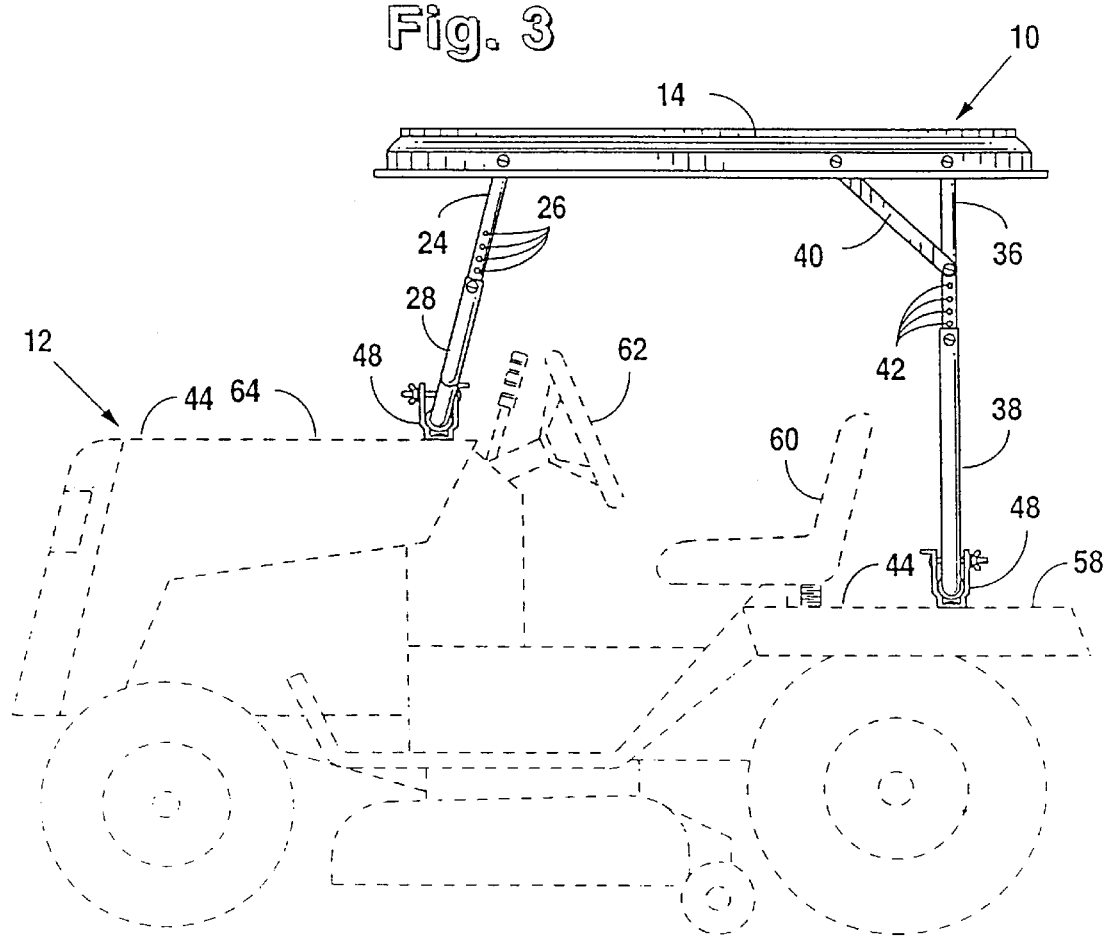
FIG. 4 is a side elevational view of the mower canopy as attached to a riding lawn mower.

It is primarily envisioned that the mower canopy 10 is an after market item to be installed on individual lawn mowers. Referring to FIG. 4 as an example, the mower canopy 10 is installed on a typical riding lawn mower 12. In the rear fender 58 behind the seat 60 are drilled two holes, each 9/32 inch in diameter, in sheet metal 44 to mount the strut braces 48 therein. A check is first made to insure there is clearance on the underside of the fender before drilling the hole. The strut brace 48 is then mounted by means of the carriage bolt 46, fender washer 50, internal star washer 52, and hex head bolt 54. The rear strut 38 is then mounted in the strut brackets 48 attached to the rear fender 58.

The same procedure is followed in mounting the front strut 28. A hole is drilled in the sheet metal 44 in front of the steering wheel 62 in the hood 64. Again, the holes are preferably 9/23 inches in diameter to receive the carriage bolts 46. Also, again the space under the hood 64 is first checked to be sure there is adequate clearance. After the holes are drilled, the strut brackets 48 are mounted. The front strut 28 is then attached inside of the strut brackets 48 mounted on the hood 64. Next, the canopy 14 is attached to front strut adjusters 24 and rear strut adjusters 36. Braces 40 are then connected between the canopy 14 and the rear strut adjusters 36. Next, the front strut adjusters 24 are telescopingly received inside of front strut 28 and secured in place as previously described. Likewise, rear strut adjusters 36 are telescopingly received inside of rear strut 38 and secured in place.

The height of the canopy 14 can be adjusted by selecting the screw holes 26 in which the front strut adjuster 24 is secured and the screw holes 32 in which the rear strut adjuster 36 is secured.

In a preferred embodiment, the canopy 14 is approximately 42 inches by 31 inches, adjustable in height, and provides over 9 square feet of coverage. The canopy 14, being preferably formed from one piece of molded plastic, can be easily cleaned by hosing or wiping it down. The canopy ring 22 provides a one inch flat bar reinforcement around the inside reinforcing skirt 18 of the canopy 14. The struts 28 and 38, as well as the adjusters 24 and 36, are made from seamless aluminum and are resistant to corrosion.

Figure 5:
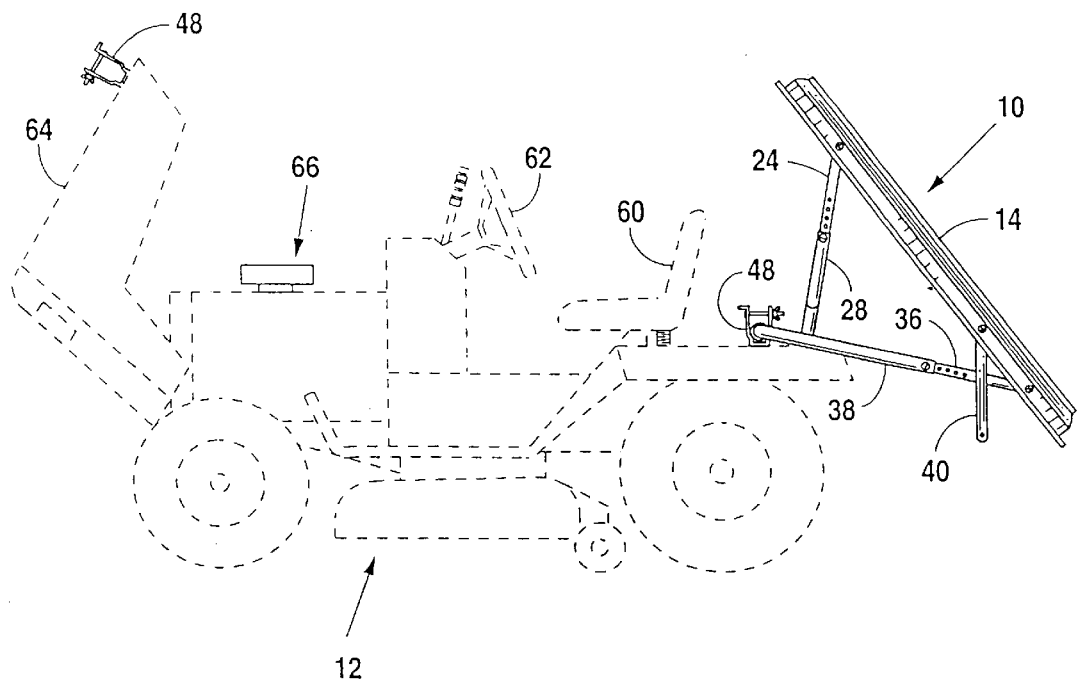
FIG. 5 is a side elevational view of the mower canopy folded back to allow access to the engine of the riding lawn mower for maintenance and repair.

Referring now to FIG. 5, an illustration of how to quickly get to the engine compartment of the riding lawn mower is illustrated. By disconnecting the front strut 28 from the strut bracket 48 mounted in the hood 64, and disconnecting the braces 40. The mower canopy 10 can quickly be pivoted back as shown in FIG. 5. Thereafter, the hood 64 can be raised allowing access to the engine compartment 66.

Figure 6:
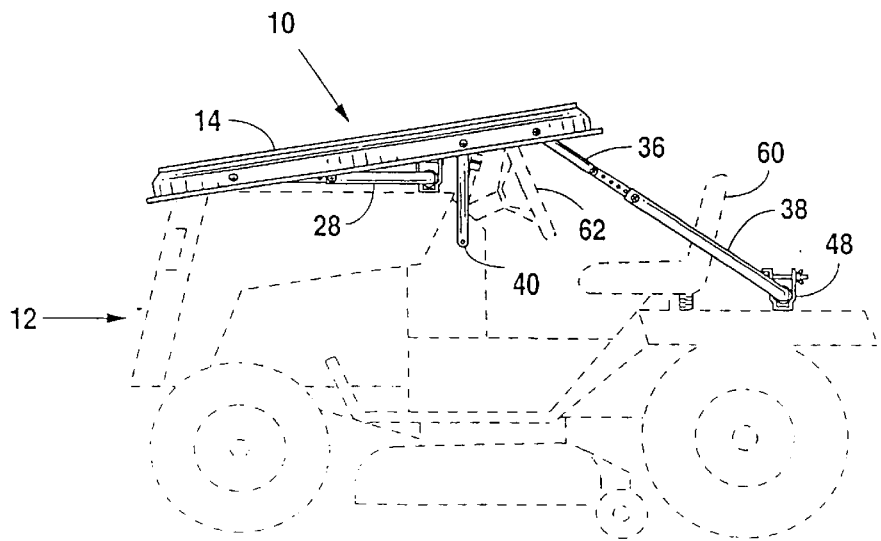
FIG. 6 is a elevational view of the mower canopy installed on a riding lawn mower, which mower canopy is folded down for storage.

Referring now to FIG. 6, the method of storing the mower canopy 10 and riding lawn mower 12 is illustrated. By simply disconnecting the braces 40, the entire mower canopy 10 folds down on top of the riding lawn mower 12 as illustrated. In this manner, the riding lawn mower 12 will still fit in a small space with almost no impediment from the mower canopy 10.

While the present invention has been disclosed in connection with the preferred embodiment thereof, it should be understood that there may be other embodiments which fall within the spirit and scope of the invention as defined by the following claims.

I claim:

1. A mower canopy for a riding lawn mower having a fender and a hood, said canopy comprising:

a canopy having reinforcing ribs to add structural strength;

a front strut fixedly attached to said hood of said riding lawn mower;

front strut adjusters fixedly connected on a first end to said canopy and on a second end to said front strut;

a rear strut fixedly attached to said fender of said riding lawn mower;

rear strut adjusters fixedly connected on a first end to said canopy and on a second end to said rear strut; and brace means rigidly connecting between said canopy and at least one pair of rear strut adjusters, said brace means maintaining the struts, strut adjusters, and canopy in a fixed relationship.

2. The mower canopy of claim 1 wherein said front strut, front strut adjusters, rear strut, and rear strut adjusters are tubular in construction with said adjusters telescopingly connecting with said respective strut.

3. The mower canopy of claim 2 wherein the height of said canopy is adjustable by movement of the telescopic connection between said adjusters and said struts.

4. The mower canopy of claim 1 further comprising strut brackets attached to said fender and said hood, said strut brackets on said fender holding said rear strut and said strut brackets on said hood holding said front strut.

5. The mower canopy of claim 1 further comprising a canopy ring mounted inside a reinforcing skirt of said canopy, said front adjusters and rear adjusters connecting to said canopy ring as well as to said canopy.

6. The mower canopy of claim 1 wherein said connections of said strut adjusters to said canopy and said attachments to said riding mower are pivotal with said brace means preventing pivotal movement.

7. The mower canopy of claim 6 wherein said connections and attachments are by wing nuts on bolts for quick assembly or disassembly.

8. The mower canopy of claim 6 having a storage position wherein said brace means is disconnected from at least one of said canopy and rear strut adjuster and said canopy is pivoted down onto said riding lawn mower.

9. The mower canopy of claim 7 having an engine access position wherein said front strut is disconnected from said hood, said brace means is disconnected from at least one of said canopy and rear strut adjuster, and said canopy is pivoted backwards to allow access to an engine.

* * * * *